Oct. 21, 1952 E. J. J. HENRIKSEN Re. 23,566

FRANGIBLE STAPLE

Original Filed Nov. 28, 1947

Inventor

ERNST JOHAN JENS HENRIKSEN

By C. M. Palmer

Attorney

Reissued Oct. 21, 1952 Re. 23,566

UNITED STATES PATENT OFFICE 23,566

FRANGIBLE STAPLE

Ernst Johan Jens Henriksen, Copenhagen, Denmark, assignor to Speed Products Company, Inc., Long Island City, N. Y., a corporation Original No. 2,564,900, dated August 21, 1951, Serial No. 788,759, November 28, 1947. Application for reissue June 16, 1952, Serial No. 293,873.

In Denmark November 1, 1947

4 Claims. (Cl. 85—49)

Matter enclosed in heavy brackets [ ] appears in the original patent but forms no part of this reissue specification; matter printed in italics indicates the additions made by reissue.

This invention relates to improvements in wire staples for tacking apparatus of the kind known as staplers which are commonly used for tacking together two or more layers or sheets of paper or other flexible materials such as leather, cardboard or the like.

[The wire staples or tacks used for such purposes (which will hereinafter be referred to as staples or tacks) comprise one or more legs with points extending from a common back or cross piece and are adapted to be pressed through the paper sheets to be tacked together by means of the tacking apparatus (hereinafter referred to as the tacker). This apparatus is usually provided with an anvil adapted to bend the two legs or flaps together when the tacker is pressed down towards the surfaces to be tacked together.]

*The wire staples or tacks are adapted to be received in a conventional stapling machine. Each of these staples embodies an inverted* U *shaped wire member comprising a back or bridge intervening and integrally merged with spaced depending legs adapted to be projected through sheets of paper or the like and thereafter folded inwardly when the staple is driven out of the stapling machine and against the anvil thereof for clinching or fastening these sheets together. By such action the sheets of paper for purposes of specification may be considered tacked or secured together.*

If the paper thus tacked is to be detached again without being torn this is done by straightening out the bent legs e. g. by means of a knife or an apparatus especially arranged for the purpose. This procedure is troublesome and the apparatus especially constructed for the detachment purpose are expensive and not always at hand when required.

Accordingly the main object of the invention is to provide means facilitating ready removal of the tack from the paper without the use of tools after the back was pressed through the paper sheets and bent at the rear side thereof. For this purpose, the back or cross piece of the tack is provided with a transverse incision, a slot or similar means, the cross piece weakening means being in or adjacent the center of the cross piece between the flaps or legs and arranged before the tack is pressed through the paper. Such weakening means will cause the back or cross piece to break easily by bending which can be effected without difficulty with the fingers after the fastening or tacking operation has been concluded, as the paper will easily permit of the back or cross piece being bent 90° or more. If the material to be tacked is stiff, e. g. cardboard which does not permit of an angular bending of the back to any appreciable extent, the back will also break by a repeated bending forwards and backwards at a similar angle. When the back has been broken in this way the two more or less hair pin shaped halves can easily be drawn or pushed out of the paper by the fingers of the operator. A chisel-like tool is the best suited piece of tool for producing the incision in the cross piece, and in the case of the type of tacks produced from a flat wire and usually assembled to a coherent strip of a length according to the structure, it is easier to produce the incision after assembly, e. g. by passing the rows between two steel rollers of which one is provided with a sharp edge which cuts into the back of the tacks on the spot where it is desired to produce the weakness. Care must be taken to ensure that the incision is not made so deep that a too great weakness is produced whereby a non-desired breaking of the back or cross piece results, e. g. caused by the stresses to which the tack may be subjected while the tacked papers are in transit. The incision may be made across the back on one of the surfaces of the same. It may run all the way round the back, or incisions opposite each other may be made on two opposite surfaces. However, the weakness may be produced in any other way than by means of incisions without departing from the scope of the invention, e. g. by a hole through the back or by providing one of the surfaces of the back with a pyramid or cone shaped cavity of a nature next to a centre punch hole.

[The preferred embodiment is the one] *One embodiment according to the invention is* where the incision is arranged on the side of the back facing the paper after tacking because the easiest way to make the angular bending of the back intended to cause the breaking is by pressing the centre of the back with a finger nail against the paper and supporting the bent flaps or legs of the tack on the opposite side of the paper by means of two finger tips, and as the incision will thus be on the top of the angle formed by the back during the bending the crack, which is the beginning of the breaking, will arise so much easier when it emanates from the sharp bottom of the incision.

When the incision is aranged in this way at the bottom or under surface of the back or cross piece it cannot be observed at a casual glance at its position, and the person who is to detach it will not be able to know whether or not the tack before him is constructed for breaking according to the invention. Therefore, it will be expedient, already during the process of manufacture, to mark the tacks provided with weakening means, in such a way that when tacked to a piece of paper such tacks can easily be distinguished from ordinary tacks. According to the invention this can be attained by providing the upper part of the tack with a marking or a stripe in a color differing from that of the remainder of the cross piece, e. g. red or by dyeing the whole tack in a color differing from that of an ordinary tack, e. g. by a dyestuff being added to the bond used for assembling tacks into rows and which in the case of the hitherto known tacks is colorless and with which the whole tack is usually coated. The marking may also be effected by a pattern pressed into the upper surface or side of the cross piece, e. g. by means of a roller which during the process of providing the weakening incision in rows of tacks presses the tacks against the roller for producing the incision.

Some embodiments of the invention are illustrated in the drawing, in which

Figure 1:
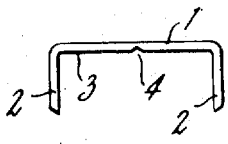
Fig. 1 shows a side elevational view of a tack.
Figure 2:
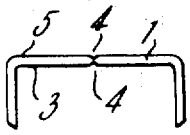
Fig. 2 is a side elevational view of another tack.
Figure 3:
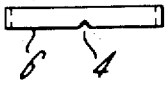
Fig. 3 is a top plan view of the tack of Fig. 1.
Figure 4:
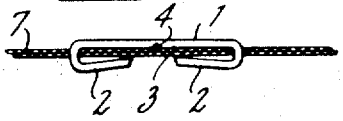
Fig. 4 is a side view of a tack inserted into superimposed sheets of paper and with bent legs or flaps.
Figure 5:
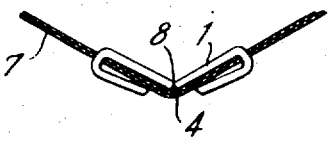
Fig. 5 shows the same tack of Fig. 4 after bending to cause breakage of the tack.
Figure 6:
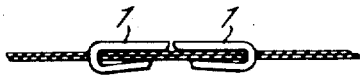
Fig. 6 is the same tack of Fig. 5 after breakage thereof.
Figure 7:
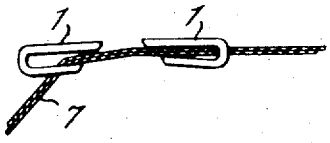
Fig. 7 illustrates how the halves of the same tack are detached from the paper.

In Fig. 1 is seen the back or cross piece 1 from which the two legs or flaps 2 extend. On the underside or surface 3 of the back is an incision 4 for the purpose of weakening the back 1, while in Fig. 2 is shown another embodiment where the weakening means is formed by incision 4 arranged at the under surface 3 as well as on the top surface 5 of the back 1. Fig. 4 shows a tack inserted into two superposed sheets of paper 7 at the under surface of which the two legs are bent toward each other. The incision 4 is at the under surface 3 of the back 1 which in Fig. 5 has been bent at an angle to thereby cause a crack or breakage 8 to extend from incision 4 to the upper surface 5. Thus the back 1 is broken into two halves after the backward bending as shown in Fig. 6 and each half can easily be detached from the paper sheets 7, as indicated in Fig. 7.

Figure 8:
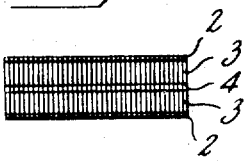
Fig. 8 is a top view of a strip of assembled tacks, and finally
Figure 9:
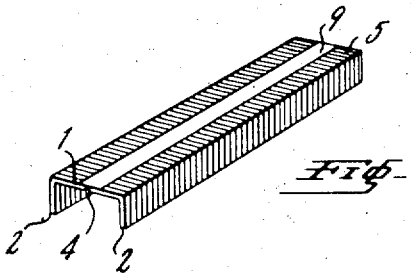
Fig. 9 shows in perspective a strip of tacks with a marking stripe.

Fig. 8 shows a strip of assembled tacks in which the incision 4 is arranged at the bottom or under surface 3 of the back 1, and Fig. 9 shows in perspective a strip of tacks provided on the top surface 5 with a marking stripe 9 to indicate the location or the incision 4 in the under surface of the tack.

*The important feature of the present invention resides in the provision of aligned notches and grooves as indicated at 4—4 in Fig. 2 which define a central weakened portion, with the upper notch or groove locating the lower notch or groove. This weakened portion will define a frangible part, which frangible part is between the two notches or grooves 4—4. Specifically recapitulating, the one piece wire staple shown in Fig. 2 is an inverted U shaped member for clinching together as is well understood sheet material such as paper or the like. In accordance with the invention the bridge which includes surface 5 is interrupted by a pair of upper and lower vertically aligned notches or incisions 4 dividing this bridge into horizontally aligned components from which the spaced depending legs as 2 extend. As is well appreciated, these aligned notches define an attenuated web intermediate the bridge and merged with the inner ends of the bridge components. As shown in Fig. 2, the pair of aligned notches of the bridge of the staple is vertically spaced apart by the intermediately arranged web means although the upper notch of a pair of such notches serves as indicating means for the lower notch of this pair. These aligned notches interrupting the bridge converge inwardly and consequently the staple may be readily folded for breaking the web to separate the bridge components. For purposes of specification, the expression "tack" shall mean an inverted U shaped one piece wire staple and the expression "back" or "cross piece" shall mean the bridge thereof from which the spaced depending legs depend.*

Having thus described the invention, what is claimed as new and desired to be secured by Letters Patent, is:

1. A bendable staple of the character described comprising a cross piece, two legs extending at substantially right angles from said cross piece, said cross piece being provided with material weakening means extending into the under surface of said cross piece and adjacent the center of said cross piece, and means located on the upper surface of said cross piece and indicating the position of the material weakening means in the under surface thereof.

*2. As a new article of manufacture, a stack of adhesively united and alined inverted substantially U-shaped wire staples each comprising a one piece member having bridge means and spaced depending legs at the ends of said bridge means and integrally merged therewith, said bridge means comprising complementary components, and said bridge means substantially intermediately thereof having alined inwardly converging notches on opposite upper and lower sides thereof defining a weakened attenuated web means substantially intermediate said bridge means and integrally merged with adjacent inner ends of said components, said upper notches serving as locating notches to locate the position of said lower notches, the foremost staple of said stack adapted to be severed therefrom and adapted to be folded for breaking said web means to separate said components.*

*3. As a new article of manufacture, a one piece wire staple for clinching layers of material together comprising bridge means and spaced depending legs at the ends of said bridge means and integrally merged therewith, said bridge means comprising complementary components, and said bridge means having alined and inwardly converging notches on opposite upper and lower sides thereof defining a weakened attenuated web means substantially intermediately of said bridge means and integrally merged with adjacent inner ends of said components, said upper notch serving as means locating said lower notch, said inner ends and web means constituting hinge means for said components for swinging the latter towards each other to break said web means.*

*4. As a new article of manufacture, a one piece*

*wire inverted U-shaped staple for clinching together layers of sheet material, comprising; bridge means and spaced depending legs at the ends of said bridge means and integrally merged therewith, said legs having pointed terminals, said bridge means comprising complementary components, attenuated web means substantially intermediate of said bridge means and integrally merged with adjacent inner ends of said components, said inner ends and web means defining a pair of upper and lower substantially vertically alined inwardly converging notches interrupting said bridge means and vertically spaced apart by said web means, said staple adapted to be folded for breaking said web means to separate said components.*

ERNST JOHAN JENS HENRIKSEN.

REFERENCES CITED

The following references are of record in the file of this patent or the original patent:

UNITED STATES PATENTS

| Number | Name | Date |
|---|---|---|
| 1,407,709 | Tibbals | Feb. 28, 1922 |
| 1,654,371 | Goodstein | Dec. 27, 1927 |
| 2,122,814 | Hansen | July 5, 1938 |
| 2,351,045 | Heller | June 13, 1944 |
| 2,357,637 | Drypolcher | Sept. 5, 1944 |

FOREIGN PATENTS

| Number | Country | Date |
|---|---|---|
| 106,350 | Switzerland | Aug. 16, 1924 |